US008269770B1

(12) United States Patent
Carr et al.

(10) Patent No.: US 8,269,770 B1
(45) Date of Patent: Sep. 18, 2012

(54) TESSELLATION OF TRIMMED PARAMETRIC SURFACES BY WALKING THE SURFACE

(75) Inventors: Nathan A. Carr, Santa Clara, CA (US); Radomir Mech, Mountain View, CA (US); Eric Vinchon, Lyons (FR)

(73) Assignee: Adobe Systems Incorporated, San Jose, CA (US)

( * ) Notice: Subject to any disclaimer, the term of this patent is extended or adjusted under 35 U.S.C. 154(b) by 1236 days.

(21) Appl. No.: 12/040,353

(22) Filed: Feb. 29, 2008

(51) Int. Cl.
*G06T 15/30* (2011.01)

(52) U.S. Cl. ........ 345/423; 345/419; 345/420; 345/427; 345/441; 345/443; 345/581; 345/582

(58) Field of Classification Search .................. 345/419, 345/420, 423, 427, 440, 441, 443, 581, 582
See application file for complete search history.

(56) References Cited

U.S. PATENT DOCUMENTS

| 5,283,860 | A  | * | 2/1994 | Einkauf et al. ............... 345/624 |
| 5,488,684 | A  |   | 1/1996 | Gharachorloo et al. |
| 5,555,356 | A  |   | 9/1996 | Scheibl |
| 6,853,373 | B2 | * | 2/2005 | Williams et al. .............. 345/419 |
| 6,906,718 | B1 | * | 6/2005 | Papakipos et al. ............ 345/441 |
| 6,920,415 | B1 | * | 7/2005 | Litke et al. ......................... 703/2 |
| 7,173,622 | B1 | * | 2/2007 | McLaughlin ................. 345/473 |
| 7,180,523 | B1 |   | 2/2007 | Macri |
| 7,212,205 | B2 | * | 5/2007 | Uesaki et al. ................. 345/423 |
| 7,280,109 | B2 | * | 10/2007 | Hoppe .......................... 345/423 |
| 7,643,030 | B2 | * | 1/2010 | Papakipos et al. ............ 345/441 |
| 7,755,623 | B2 | * | 7/2010 | Rockwood et al. ........... 345/420 |
| 7,928,979 | B2 | * | 4/2011 | Patel et al. .................... 345/423 |
| 2007/0018988 | A1 | * | 1/2007 | Guthe ........................... 345/441 |

* cited by examiner

*Primary Examiner* — Kimbinh T Nguyen
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for tessellating a trimmed parametric surface comprising a parametric surface and a trim curve. The parametric surface may be tessellated to produce a set of polygons approximating the parametric surface. A first polygon of the set of polygons in which a first point on the trim curve is located may be determined. A second point on the trim curve may be projected into a plane, wherein the plane is determined by the first polygon. A set of one or more additional polygons of the set of polygons may be projected into the plane. A second polygon of the set of one or more additional polygons in which the second point on the trim curve is located may be determined.

28 Claims, 5 Drawing Sheets

TESSELLATION OF TRIMMED PARAMETRIC SURFACES BY WALKING THE SURFACE

BACKGROUND

1. Field of the Invention

The present invention is directed to computer systems; and more particularly, it is directed to the tessellation of surfaces using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of digital images. The geometric objects may typically be located in two-dimensional or three-dimensional space. Suitable image editors, such as Adobe Illustrator® (available from Adobe Systems, Inc.), may be used to perform operations on these objects. Typical operations include rotation, translation, stretching, skewing, changing depth order, and combining objects with other objects. While raster graphics may often lose apparent quality when scaled to a higher resolution, vector graphics may scale to the resolution of the device on which they are ultimately rendered.

To render vector graphics on raster-based imaging devices (e.g., most display devices and printers), the geometric objects are typically converted to raster graphics data in a process called rasterization. Prior to final rasterization, surfaces defined by the geometric objects may be covered with non-overlapping polygons (e.g., triangles or quadrilaterals) in a process called tessellation. The polygons may also be referred to as tessellae, and the arrangement of non-overlapping polygons may be referred to as a mesh. Each polygon is defined by at least three vertices, and each vertex may be characterized by color and alpha values. Because tessellation of a shaded surface may produce many polygons, a surface may be rendered with fine variations in the color and alpha values.

Each polygon (e.g., quadrilateral) in the surface may be further subdivided into Gouraud shaded triangles for rendering to an output device. A geometric object referred to herein as a parametric surface may be defined by a parametric equation. The parametric equation may involve two parameters such as (u, v). A trimmed parametric surface may include a "hole" in the surface defined by a trim curve. By trimming or cutting out parts of the surface, the trim curve may define which parts of the surface are used. Both the parametric surface and the trim curve may be represented in three dimensions. A similar object may be defined using a non-uniform rational B-spline (NURBS) surface.

Trimmed parametric surfaces pose a problem for typical visualization techniques such as ray-tracing and rasterization. In visualizing a parametric surface using ray-tracing techniques, the determination of whether the ray has intersected the surface within a trimmed region may involve computing the intersection of a ray with the parametric surface followed by a point-in-polygon test. Costly iterative methods are typically used for these ray-patch intersection computations.

Alternatively, in visualizing a parametric surface using rasterization techniques, a pre-process may be performed on the parametric surface to convert it into a collection of rasterizable primitives (e.g., triangles). The rasterization may also include a projection of the trim curve (in 2D or 3D) into the parametric uv space of the surface. This projection step typically requires the use of a root-finding technique (e.g., the Newton-Raphson root-finding method) to find the closest point on the patch for each point on the trim curve. The root-finding technique may comprise a computationally expensive numerical method that is performed iteratively for each point on the trim curve in order to project the trim curve into the parametric uv space of the surface.

SUMMARY

Various embodiments of systems, methods, and computer-readable storage media for tessellating a trimmed parametric surface are disclosed. The trimmed parametric surface may comprise a parametric surface and a trim curve. In one embodiment, the parametric surface may be tessellated to produce a set of polygons (e.g., triangles or quadrilaterals) approximating the parametric surface. A first polygon of the set of polygons in which a first point on the trim curve is located may be determined. For example, the first polygon may be determined by using a root-finding technique to find a closest point in the set of polygons to the first point on the trim curve.

In one embodiment, a second point on the trim curve may be projected into a plane, wherein the plane is determined by the first polygon. A set of one or more additional polygons of the set of polygons may be projected into the plane. For example, the set of one or more additional polygons may comprises one or more polygons adjacent to or neighboring the first polygon. A second polygon of the set of one or more additional polygons in which the second point on the trim curve is located may be determined. In one embodiment, determining the second polygon may comprise generating a line segment connecting the first point and the second point and determining that the line segment crosses a boundary between the first polygon and the second polygon.

In one embodiment, similar steps may be performed to project additional points on the trim curve into the polygon mesh produced by the tessellation of the parametric surface. The polygons approximating the parametric surface may be trimmed accordingly by the points on the trim curve as projected using the techniques described above. In this manner, the trimmed parametric surface may be tessellated with only one use of the root-finding method (e.g., for the first point on the trim curve) rather than a use of the root-finding method for every point on the trim curve.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Various embodiments may provide efficient tessellation of surfaces such as trimmed parametric surfaces. Points on a trim curve may be projected onto a parametric surface by computing (u, v) coordinates of each point in the parametric space of the surface. The trim curve may be located on the parametric surface by projecting it into planes formed by triangles of the surface, beginning with a first point on the curve, and walking from one triangle to another. In this manner, an expensive iterative solution to tessellating the trimmed parametric surface may be avoided.

In one embodiment, the parametric surface may be referred to herein as a patch. In one embodiment, the parametric surface may comprise a surface defined by a non-uniform rational B-spline (NURBS). The parametric surface may be defined by a parametric equation involving two parameters such as (u, v). By trimming or cutting out parts of the surface, a trim curve may define which parts of the surface are used and which parts are discarded. The trim curve may also be referred to herein as a "space curve." Both the parametric surface and the trim curve may be represented in three dimensions.

In a prior approach to tessellating trimmed parametric surfaces, each point on the three-dimensional trim curve is projected into uv space. The projection operation is typically expensive because it involves finding the closed point and corresponding (u, coordinates on the surface for a point p on the trim curve. Further complications may occur when the same trim curve modifies multiple patches.

The tessellation of a trimmed parametric surface may include the projection of points on the trim curve onto the surface. Using the systems and methods described herein, the task of projecting points on a trim curve onto a surface may be performed efficiently. The surface itself may initially be tessellated as if the trim curve did not modify the surface. The tessellation may produce a set of triangles approximating the original parametric surface but ignoring the effect of the trim curve. Any suitable technique for tessellation of the surface may be used. For example, the tessellation may comprise a Delaunay triangulation. During the tessellation, the two-dimensional (2D) points associated with the original three-dimensional (3D) points on the surface may be stored. The 2D points may comprise a grid. The trim curve may then be applied to the set of triangles instead of to the original parametric surface. Instead of projecting points on the trim curve into each patch's uv space, both the trim curve and the triangles of the path may be projected into a consistent space. In one embodiment, the use of this consistent space yields a correspondence between points on the trim curve and positions on the pre-trimmed triangulated mesh surface.

To "trim" the set of triangles using the trim curve, both the set of triangles and the first point on the trim curve may be projected onto a plane. The plane may be defined by the triangle into which the first point on the curve falls. This first triangle (i.e., the triangle into which the first point on the curve falls) may be determined using a root-finding technique. In one embodiment, the root-finding technique may comprise the Newton-Raphson root-finding method. The first triangle may be formed by points on the surface with (u, v) parameters on a uniform grid. In projecting the first point in this manner, the (u, v) coordinates of the first point as projected into the surface parametric space may be computed.

After projecting the first point on the trim curve in this manner, each subsequent point on the curve may be projected into the same plane as the preceding point. The plane may be determined by the triangle into which the preceding point was projected. If the current point is inside the same triangle as the preceding point, then the (u, v) coordinates of the projected current point may be computed by interpolating the coordinates associated with the triangle vertices. If the current point is outside the same triangle as the preceding point, then the current point is connected to the previously projected point by a line segment, and the triangle edge intersected by the line segment is determined. The next triangle (i.e., the triangle that contains the intersection between the current point and the set of triangles) may be determined in this manner. Thus, the technique can "walk" from one triangle to the next triangle. By using these techniques, the trimmed parametric surface may be tessellated with only one use of the root-finding method (e.g., for the first point on the trim curve) rather than a use of the root-finding method for every point on the trim curve.

In one embodiment, the trim curve may be projected onto the set of triangles (i.e., the mesh surface) as follows. A set of points on the trim curve may be generated by sampling the trim curve. For each point after an initial point, a local plane may be chosen for projection based on the triangle $t_i$ containing the last projected point $p_n$. The next trim curve point $p_{n+1}$ is projected onto this plane. Each triangle neighboring the current triangle (e.g., any triangle that shares a side or a vertex with the current triangle) may be projected onto this plane until a triangle $t_j$ is found whose projection contains $p_{n+1}$. The current triangle $t_i$ may be updated to $t_j$, and the process may repeat for the next point. Thus, the local plane of projection may change from one point to the next. Each time a triangle and a corresponding point (i.e., a point contained in that triangle's projection) is found, the uv coordinates of the point may be determined (e.g., using barycentric coordinates) and/or a further tessellation using the trim curve may be performed.

Figure 1A:
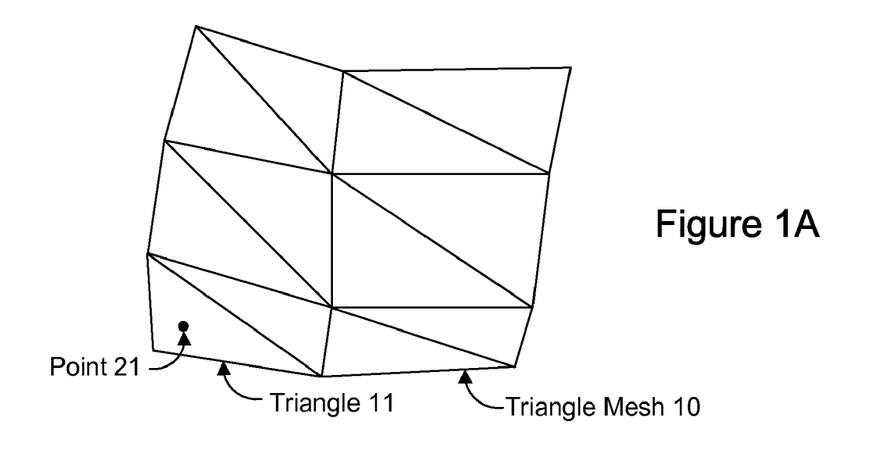
FIGS. 1A, 1B, and 1C illustrate an example of a tessellated parametric surface that is "walked" to apply a trim curve to the surface according to one embodiment.
Figure 1B:
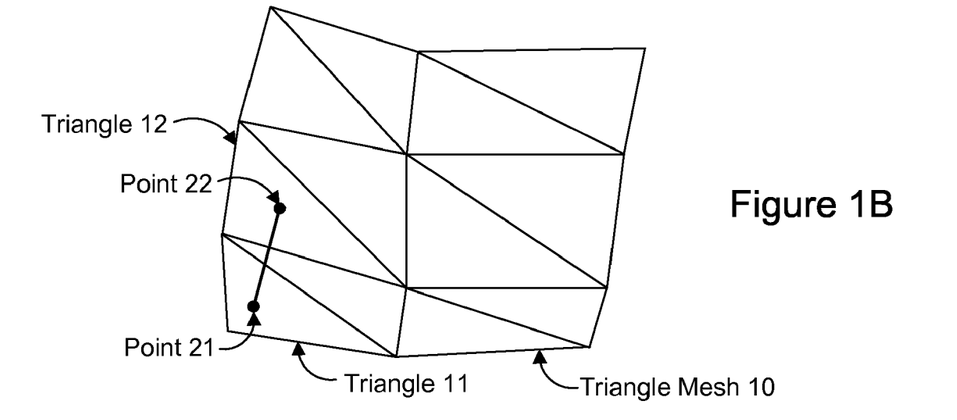
Figure 1C:
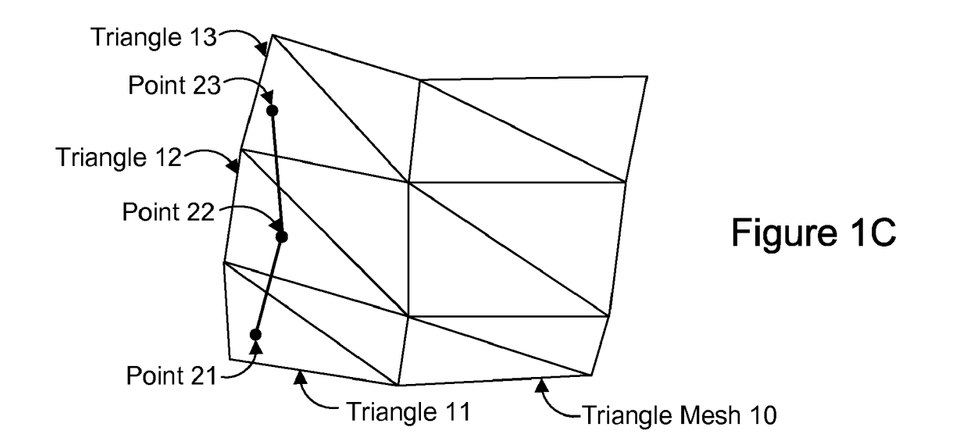

FIGS. 1A, 1B, and 1C illustrate an example of a tessellated parametric surface that is "walked" to apply a trim curve to the surface according to one embodiment. As discussed above, the parametric surface has been tessellated to produce a set of triangles forming a triangle mesh 10. A first point 21 on the trim curve may be projected into a first triangle 11 using a suitable technique (e.g., a root-finding technique). Using the techniques described herein, a second point 22 may be projected into the plane determined by the first triangle 11. Triangles near the first triangle 11, such as a second triangle 12, may also be projected into the plane until the triangle that contains the second point 22 is found. Similarly, a third point 23 may be projected into the plane determined by the second triangle 12 until the appropriate triangle 13 is found. The process may continue for additional points until the entire trim curve is projected into the triangle mesh.

Figure 2:
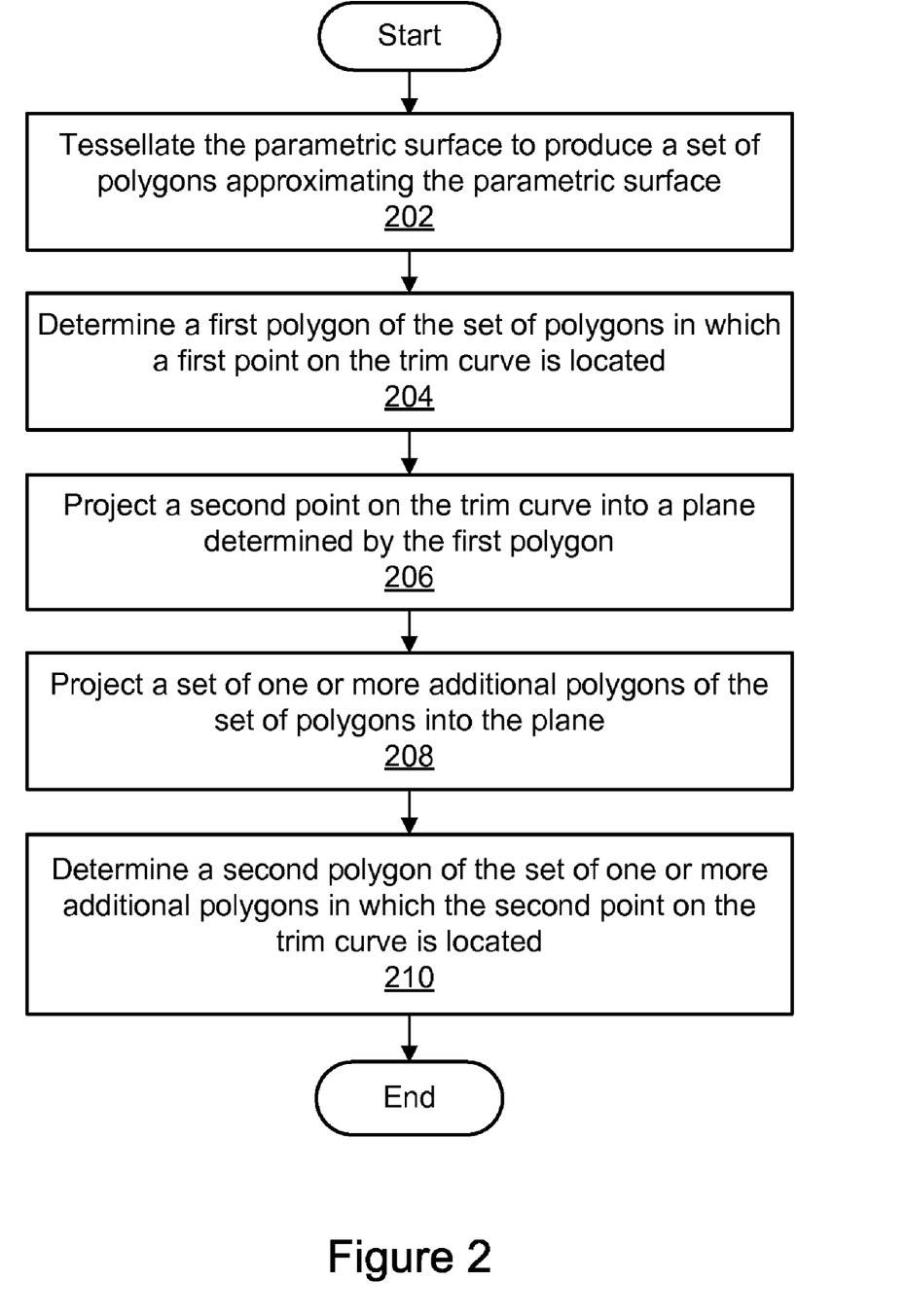
FIG. 2 is a flow diagram illustrating an example of the tessellation of a trimmed parametric surface according to one embodiment.

FIG. 2 is a flow diagram illustrating an example of the tessellation of a trimmed parametric surface according to one embodiment. Although FIG. 2 illustrates the projection of two points (e.g., the first two points) on the trim curve, similar techniques may be applied to additional points such that the entire trim curve is processed for trimming the parametric surface. The trimmed parametric surface may comprise a parametric surface and a trim curve. As shown in block 202, the parametric surface may be tessellated to produce a set of polygons (e.g., triangles or quadrilaterals) approximating the parametric surface. As shown in block 204, a first polygon of the set of polygons in which a first point on the trim curve is located may be determined. For example, the first polygon may be determined by using a root-finding technique to find a closest point in the set of polygons to the first point on the trim curve.

As shown in block 206, a second point on the trim curve may be projected into a plane, wherein the plane is determined by the first polygon. As shown in block 208, a set of one or more additional polygons of the set of polygons may be projected into the plane. For example, the set of one or more additional polygons may comprises one or more polygons adjacent to or neighboring the first polygon. As shown in block 210, a second polygon of the set of one or more additional polygons in which the second point on the trim curve is located may be determined. In one embodiment, determining the second polygon may comprise generating a line segment connecting the first point and the second point and determining that the line segment crosses a boundary between the first polygon and the second polygon.

Figure 3:
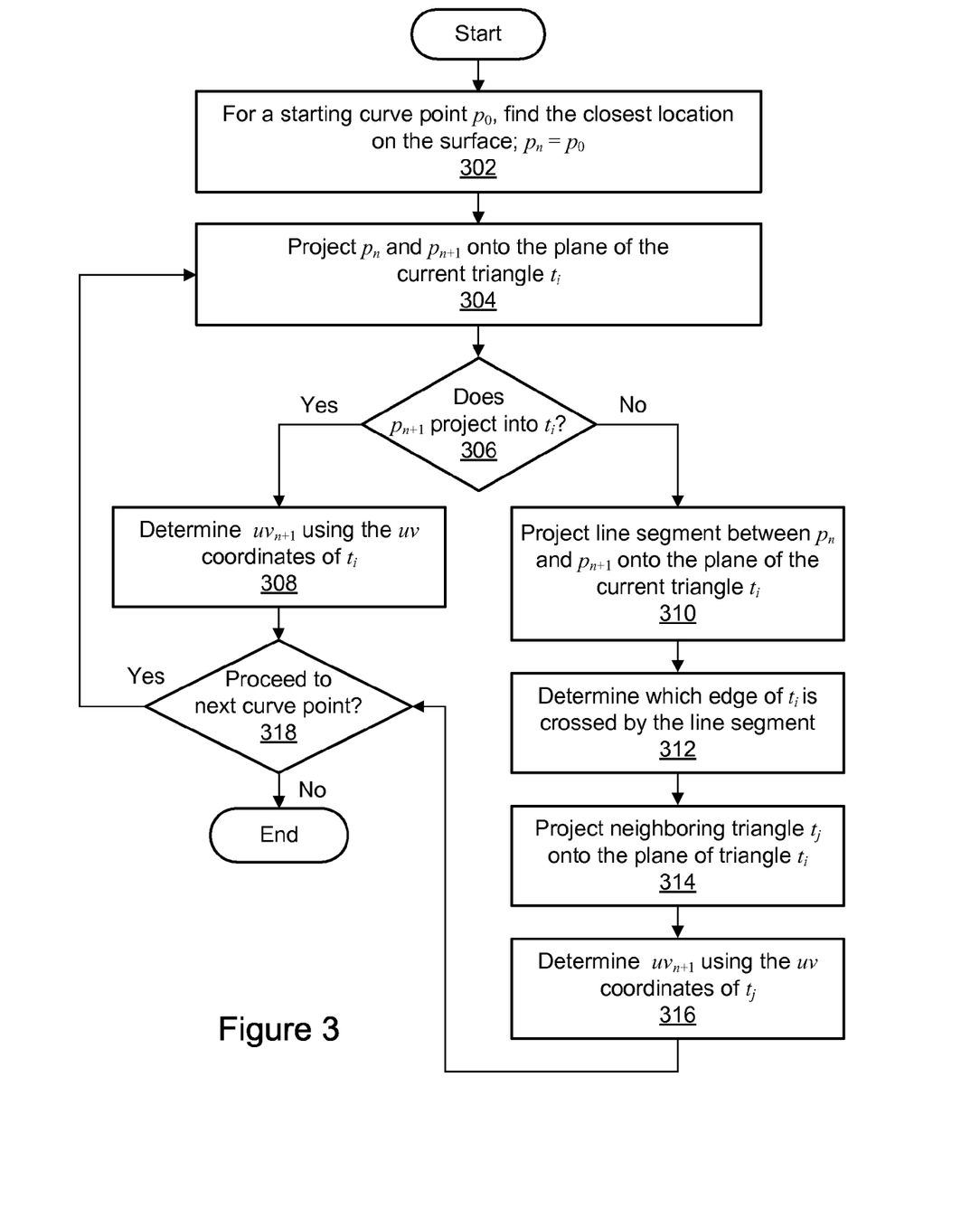
FIG. 3 is a flow diagram illustrating a method for tessellation of a trimmed parametric surface according to one embodiment.

FIG. 3 is a flow diagram illustrating one embodiment of a method for tessellation of a trimmed parametric surface. As discussed above, the parametric surface may be tessellated initially to produce a set of polygons such as triangles. As shown in block 302, the closest location $uv_0$ on the surface may be found for some starting curve point $p_0$. The starting curve point $p_0$ may be determined arbitrarily in one embodiment. As discussed above, a root-finding technique may be used to determine the closest location $uv_0$ on the surface. In one embodiment, the coordinates $uv_0$ may correspond to the specific triangle $t_i$ because there exists an implicit regular tessellation of the patch. As shown in block 304, both $p_n$ and $p_{n+1}$ may be projected onto the plane of the current triangle $t_i$. In this manner, the next curve point $p_{n+1}$ may be found.

As shown in block 306, it may be determined whether $p_{n+1}$ projects inside the triangle $t_i$. If $p_{n+1}$ projects inside the triangle $t_i$, then the coordinates $uv_{n+1}$ may be determined using the triangle's uv coordinates as shown in block 308. If it is determined in 318 that additional curve points remain to be processed, the method may continue for the next point as shown in block 304.

If, however, $p_{n+1}$ projects outside the triangle $t_i$, then the line segment between $p_n$ and $p_{n+1}$ may be projected onto the plane of $t_i$ as shown in block 310. As shown in block 312, it may be determined which edge of $t_i$ this line segment crosses. As shown in block 314, $t_i$'s neighboring triangle $t_j$, which may share the edge crossed by the line segment, may be projected onto the plane of $t_j$. If $p_{n+1}$ projects to the interior of then $uv_{n+1}$ may be computed using the uv coordinates of the triangle $t_j$ as shown in block 316. The triangle $t_j$ becomes the current triangle. If it is determined in 318 that additional curve points remain to be processed, the method may continue for the next point as shown in block 304.

Typically, the trim curve comprises a closed loop. Thus, when the penultimate point is encountered, a line segment may be generated to connect the penultimate point and the first point. Once the triangles affected by the trim curve have been determined, the path of the trim curve through each triangle may be determined using appropriate techniques. The set of triangles representing the parametric surface may be clipped accordingly to reflect the modification of the trim curve as projected using the method discussed above.

The embodiment shown in FIG. 3 may be used when the trim curve is very close to the surface and the local curvature of the patch is slowly varying. In some circumstances (e.g., if the surface is curving very rapidly), a point on the trim curve may fail to fall within the projection of any of the triangles. In this case, the embodiment shown in FIG. 3 may be augmented by using a root-finding technique or other suitable technique to find a uv correspondence in the surface mesh for the problematic point. In one embodiment, this additional use of the root-finding technique in the middle of the trim curve projection may be substantially reduced or avoided by increasing the number of triangles in the tessellation, thereby decreasing the angular variation from triangle to triangle. In one embodiment, this additional use of the root-finding technique in the middle of the trim curve projection may be substantially reduced or avoided by increasing the granularity of the sampling of the trim curve, thereby generating a larger set of points to project.

In one embodiment, the trimmed parametric surface may be tessellated to produce a set of quadrilaterals (i.e., quads) instead of a set of triangles. In this case, the point on the surface that is the nearest to the first point of the trim curve may be found. The quad(s) (e.g., as many as four) that pass through this nearest point may then be determined. In this manner, the quad that contains the current point may be determined.

When quads are used instead of triangles, the selection of the plane into which to project subsequent points may differ from the embodiment shown in FIG. 3. Because all vertices of a particular quad may not lie in the same plane, a plane that approximates the quad may be chosen. Quads may be represented by bilinear surfaces. To avoid the iterative process typically used to project a point onto such a surface, the bilinear surface may be projected into a plane. The plane may be chosen such that a point on the plane passes through the barycenter of the four points which define the bilinear surface. The plane may also be chosen such that the normal of the plane is perpendicular to vectors $v_1$ and $v_2$. The vectors $v_1$ and $v_2$ may pass through the middle of each opposite segment. In other words, if $p_0$, $p_1$, $p_2$, $p_3$ are the quad's corners oriented counterclockwise, then:

$$v_1 = \frac{p_1 + p_2}{2} - \frac{p_3 + p_0}{2} \text{ and}$$
$$v_2 = \frac{p_2 + p_3}{2} - \frac{p_0 + p_1}{2}$$

In one embodiment, the expense of projecting a point onto this surface may be equivalent to resolving a second degree equation. To find the quad containing the next point, similar techniques may be used as in finding the next triangle.

In one embodiment, the original point on the 3D trim curve may be somewhat distant from the surface approximation on the tessellated mesh. Thus, there may be a possibility that one projected segment of a trim curve may intersect with another projected segment of the trim curve. For detection of such intersections, the tessellated surface structure may store the intersection between a projected 3D curve segment and the boundaries of polygons in the parametric representation. If an intersection between two projected segments is detected, the original surface may be used instead of the tessellated representation for projection of the problematic point. In one embodiment, the likelihood of such intersections may be reduced by increasing the number of triangles in the tessellation, thereby decreasing the angular variation from triangle to triangle.

In various embodiments, the techniques disclosed herein for tessellating trimmed parametric surfaces may be implemented in various products such as image editors and/or readers, print drivers, display drivers, and other suitable elements in a rendering pipeline. The image editors and/or readers may include various products available from Adobe Systems, Inc., such as versions of Adobe Illustrator® or Adobe Acrobat®.

Figure 4:
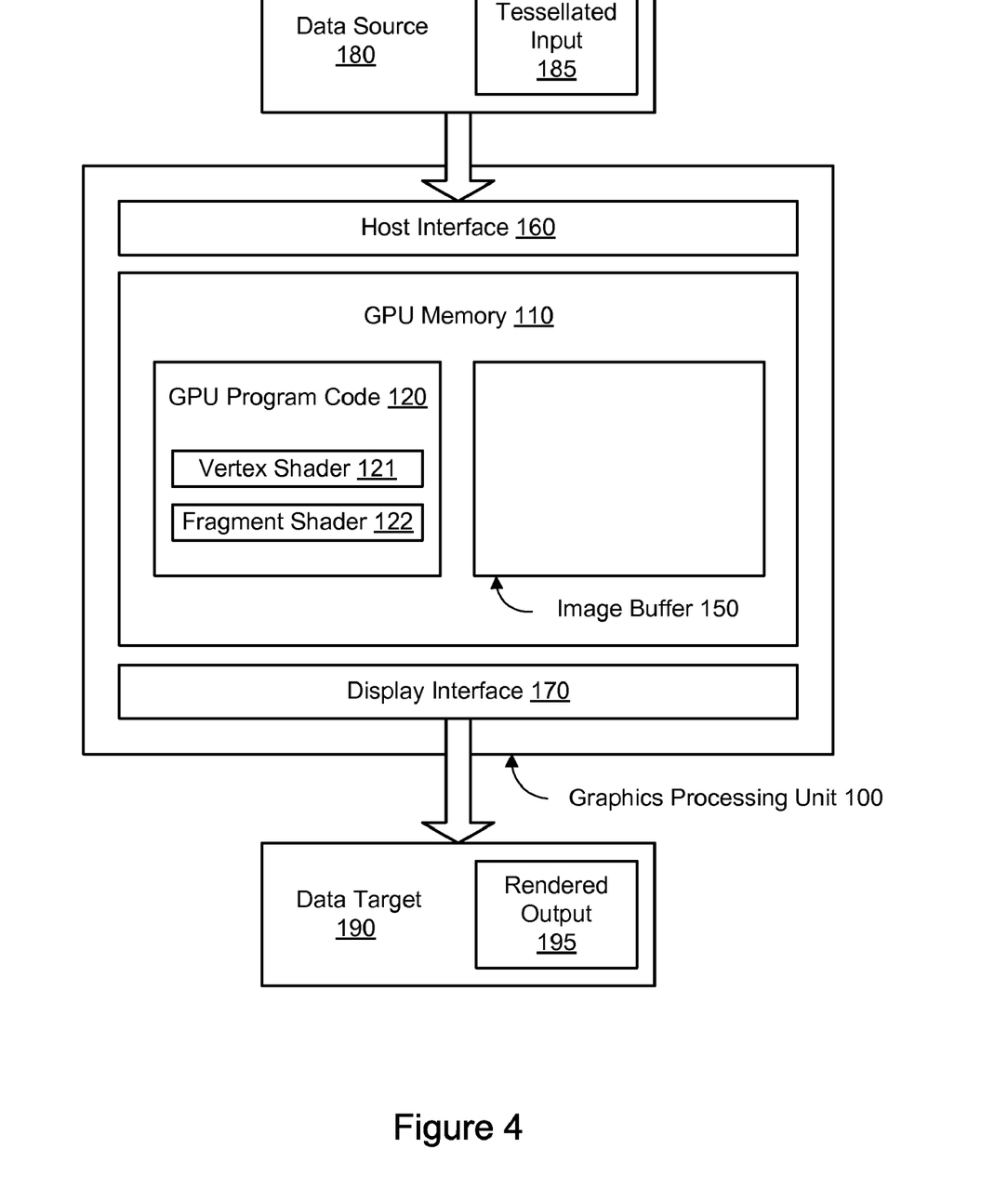
FIG. 4 is a diagram illustrating one embodiment of a graphics processing unit configured for rendering the tessellated geometry produced by the techniques described herein for tessellating a trimmed parametric surface.
Figure 5:
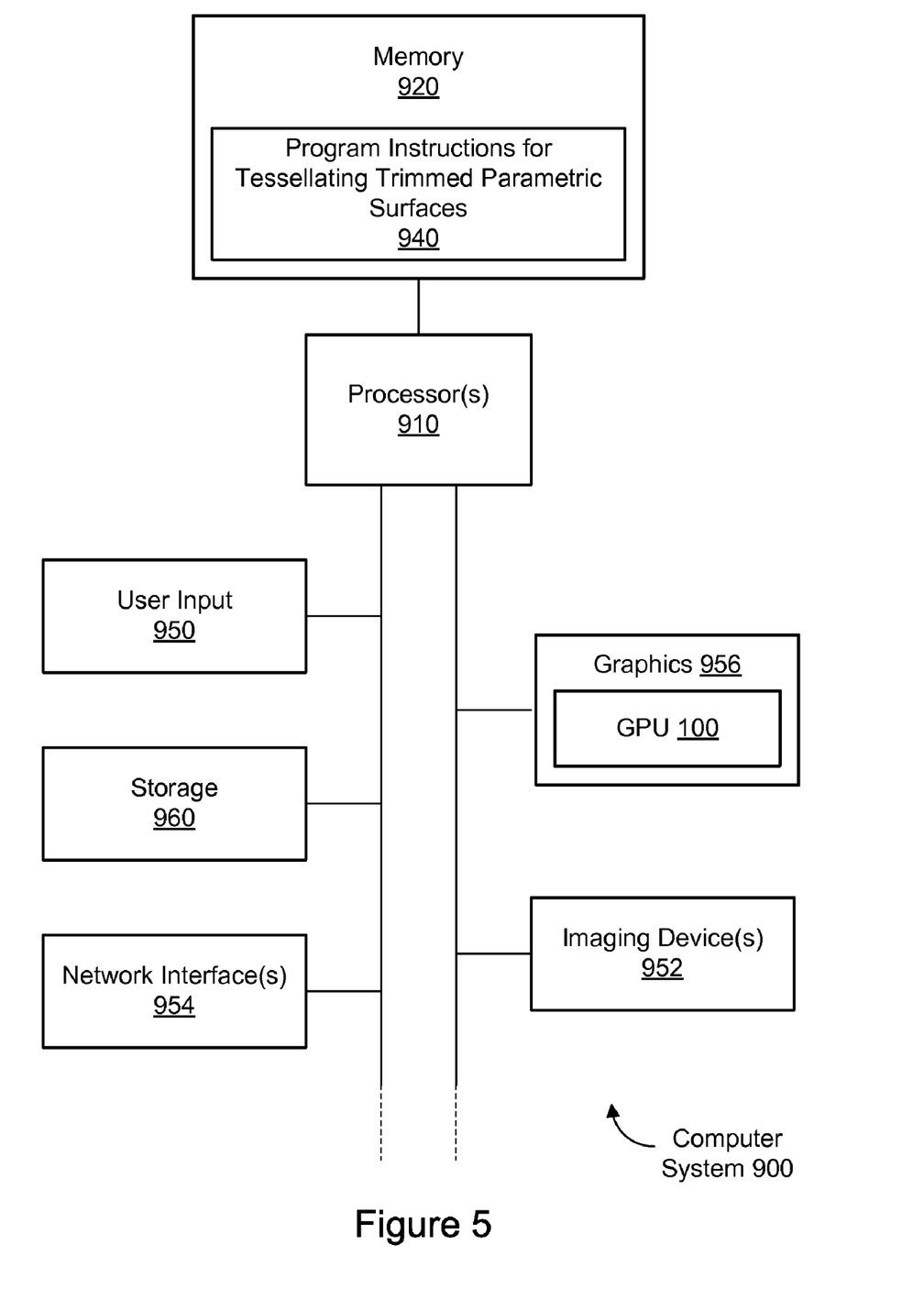
FIG. 5 is a diagram illustrating constituent elements of a computer system that is configured to implement embodiments of the system and method for tessellating a trimmed parametric surface.

FIG. 4 is a diagram illustrating one embodiment of a graphics processing unit (GPU) configured for rendering the tessellated geometry produced by the techniques described herein for tessellating a trimmed parametric surface. The GPU 100, also referred to herein as a graphics processor, may comprise a dedicated graphics rendering device associated with a computer system. An example of a suitable computer system 900 for use with the GPU 100 is illustrated in FIG. 5. Turning back to FIG. 4, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 4. It is contemplated that GPU architectures other than the example architecture of FIG. 4 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900 or the host system itself). For example, the data source 180 may provide image input data 185 (e.g., tessellated geometry produced by the techniques described herein for tessellating a trimmed parametric surface) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise an imaging device 952 such as a display, and the GPU 100 (along with other graphics components and/or interfaces 956) may "drive" the display 952 by providing graphics data, such as a ray traced scene, at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, the GPU 100 may include GPU program code 120 that is executable by the GPU 100 to perform aspects of the techniques discussed herein. For example, geometric objects in the image input 185 may be rasterized to pixels by a rasterizer during a rendering process including execution of the GPU program code 120 on the GPU 100. Elements of the GPU program code 120 may be provided to the GPU 100 by a host computer system (e.g., the data source 180) and/or native to the GPU 100. In one embodiment, the GPU program code 120 may comprise a vertex shader 121. A vertex shader 121 comprises program instructions that are executable by the GPU 100 to determine properties (e.g., position) of a particular vertex. A vertex shader may expect input such as uniform variables (e.g., constant values for each invocation of the vertex shader) and vertex attributes (e.g., per-vertex data). In one embodiment, the GPU program code 120 may comprise a fragment shader 122. The fragment shader 122 may also be referred to as a pixel shader 122. The fragment shader 122 comprises program instructions that are executable by the GPU 100 to determine properties (e.g., color) of a particular pixel. A fragment shader may expect input such as uniform variables (e.g., constant values for each invocation of the fragment shader) and pixel attributes (e.g., per-pixel data). In generating the rendered image output 195, both the vertex shader 121 and the fragment shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 4, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 150 may comprise a multi-sampling buffer usable for automatic anti-aliasing.

FIG. 5 is a diagram illustrating constituent elements of a computer system 900 that is configured to implement embodiments of the system and method for tessellating a trimmed parametric surface. The computer system 900 may include one or more processors 910 implemented using any desired architecture or chip set, such as the SPARCT™ architecture, an x86-compatible architecture from Intel Corporation or Advanced Micro Devices, or an other architecture or chipset capable of processing data. Each of the one or more processors 910 may include one or more cores. Any desired operating system(s) may be run on the computer system 900, such as various versions of Unix, Linux, Windows® from Microsoft Corporation, Mac OS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 4. Additionally, the computer system 900 may include one or more imaging devices 952. The one or more imaging devices 952 may include various types of raster-based imaging devices such as monitors and printers.

In one embodiment, the one or more imaging devices 952 may comprise one or more display devices 952 that are coupled to the graphics component 956 for display of data provided by the graphics component 956. The one or more imaging devices 952 may be used to print and/or display a trimmed parametric surface that is tessellated and rendered using the techniques described herein.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate computer-readable memory medium such as any of various types of ROM or RAM (e.g., DRAM, SDRAM, RDRAM, SRAM, etc.), or combinations thereof. The program instructions may also be stored on a computer-readable storage device or computer-readable storage media 960 accessible from the processor(s) 910. Any of a variety of storage devices or storage media 960 may be used to store the program instructions 940 in different embodiments, including any desired type of persistent and/or volatile storage devices, such as individual disks, disk arrays, optical devices and associated media (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 5, as illustrated by the ellipsis shown.

In various embodiments, the elements shown in FIGS. 2 and 3 may be performed in a different order than the illustrated order. In FIGS. 2 and 3, any of the operations described in the elements may be performed programmatically (i.e., by a computer according to a computer program). In FIGS. 2 and 3, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
performing, by a computer:
generating a tessellated trimmed parametric surface based on a parametric surface and a trim curve, said generating comprising:
tessellating the parametric surface to produce a set of polygons approximating the parametric surface;
determining a first polygon of the set of polygons in which a first point on the trim curve is located;
projecting a second point on the trim curve into a plane, wherein the plane is determined by the first polygon of the set of polygons;
projecting a set of one or more additional polygons of the set of polygons into the plane; and
determining a second polygon of the set of one or more additional polygons in which the second point on the trim curve is located.

2. The method as recited in claim 1, wherein determining the first polygon of the set of polygons in which the first point on the trim curve is located comprises using a root-finding technique to find a closest point in the set of polygons to the first point on the trim curve.

3. The method as recited in claim 1, wherein determining a second polygon of the set of one or more additional polygons in which the second point on the trim curve is located comprises:
generating a line segment connecting the first point projected into the plane and the second point projected into the plane;
determining that the line segment crosses a boundary between the first polygon and the second polygon projected into the plane.

4. The method as recited in claim 1, further comprising:
projecting a third point on the trim curve into a second plane, wherein the second plane is determined by the second polygon;
projecting a second set of one or more additional polygons of the set of polygons into the second plane; and
determining a third polygon of the second set of one or more additional polygons in which the third point on the trim curve is located.

5. The method as recited in claim 1, further comprising:
projecting a third point on the trim curve into a second plane, wherein the second plane is determined by the second polygon;
determining that the third point on the trim curve is located in the second polygon.

6. The method as recited in claim 1, wherein the set of one or more additional polygons comprises one or more polygons neighboring the first polygon.

7. The method as recited in claim 1, wherein the set of polygons comprises a set of quadrilaterals, and wherein the plane approximates a quadrilateral containing the first point on the trim curve.

8. The method as recited in claim 1, wherein the points on the trim curve are determined by sampling the trim curve.

9. The method as recited in claim 1, further comprising:
rendering the tessellated trimmed parametric surface; and
displaying the rendered tessellated trimmed parametric surface using an imaging device.

10. A non-transitory, computer-readable storage medium, storing program instructions, wherein the program instructions are computer-executable to implement:
generating a tessellated trimmed parametric surface based on a parametric surface and a trim curve, said generating comprising:

tessellating the parametric surface to produce a set of polygons approximating the parametric surface;

determining a first polygon of the set of polygons in which a first point on the trim curve is located;

projecting a second point on the trim curve into a plane, wherein the plane is determined by the first polygon of the set of polygons;

projecting a set of one or more additional polygons of the set of polygons into the plane; and determining a second polygon of the set of one or more additional polygons in which the second point on the trim curve is located.

11. The non-transitory, computer-readable storage medium as recited in claim 10, wherein determining the first polygon of the set of polygons in which the first point on the trim curve is located comprises using a root-finding technique to find a closest point in the set of polygons to the first point on the trim curve.

12. The non-transitory, computer-readable storage medium as recited in claim 10, wherein determining a second polygon of the set of one or more additional polygons in which the second point on the trim curve is located comprises:

generating a line segment connecting the first point projected into the plane and the second point projected into the plane;

determining that the line segment crosses a boundary between the first polygon and the second polygon projected into the plane.

13. The non-transitory, computer-readable storage medium as recited in claim 10, wherein the program instructions are further computer-executable to implement:

projecting a third point on the trim curve into a second plane, wherein the second plane is determined by the second polygon;

projecting a second set of one or more additional polygons of the set of polygons into the second plane; and determining a third polygon of the second set of one or more additional polygons in which the third point on the trim curve is located.

14. The non-transitory, computer-readable storage medium as recited in claim 10, wherein the program instructions are further computer-executable to implement:

projecting a third point on the trim curve into a second plane, wherein the second plane is determined by the second polygon;

determining that the third point on the trim curve is located in the second polygon.

15. The non-transitory, computer-readable storage medium as recited in claim 10, wherein the set of one or more additional polygons comprises one or more polygons neighboring the first polygon.

16. The non-transitory, computer-readable storage medium as recited in claim 10, wherein the set of polygons comprises a set of quadrilaterals, and wherein the plane approximates a quadrilateral containing the first point on the trim curve.

17. The non-transitory, computer-readable storage medium as recited in claim 10, wherein the points on the trim curve are determined by sampling the trim curve.

18. The non-transitory, computer-readable storage medium as recited in claim 10, wherein the program instructions are further computer-executable to implement:

rendering the tessellated trimmed parametric surface; and displaying the rendered tessellated trimmed parametric surface using an imaging device.

19. A system, comprising:

at least one processor; and a memory coupled to the at least one processor, wherein the memory stores program instructions, and wherein the program instructions are executable by the at least one processor to:

generate a tessellated trimmed parametric surface based on a parametric surface and a trim curve, wherein to generate the tessellated trimmed parametric surface the program instructions are executable by the at least one processor to:

tessellate the parametric surface to produce a set of polygons approximating the parametric surface;

determine a first polygon of the set of polygons in which a first point on the trim curve is located;

project a second point on the trim curve into a plane, wherein the plane is determined by the first polygon of the set of polygons;

project a set of one or more additional polygons of the set of polygons into the plane; and determine a second polygon of the set of one or more additional polygons in which the second point on the trim curve is located.

20. The system as recited in claim 19, wherein, in determining the first polygon of the set of polygons in which the first point on the trim curve is located, the program instructions are executable by the at least one processor to use a root-finding technique to find a closest point in the set of polygons to the first point on the trim curve.

21. The system as recited in claim 19, wherein, in determining a second polygon of the set of one or more additional polygons in which the second point on the trim curve is located, the program instructions are executable by the at least one processor to:

generate a line segment connecting the first point projected into the plane and the second point projected into the plane;

determine that the line segment crosses a boundary between the first polygon and the second polygon projected into the plane.

22. The system as recited in claim 19, wherein the program instructions are further executable by the at least one processor to:

project a third point on the trim curve into a second plane, wherein the second plane is determined by the second polygon;

project a second set of one or more additional polygons of the set of polygons into the second plane; and determine a third polygon of the second set of one or more additional polygons in which the third point on the trim curve is located.

23. The system as recited in claim 19, wherein the program instructions are further executable by the at least one processor to:

project a third point on the trim curve into a second plane, wherein the second plane is determined by the second polygon;

determine that the third point on the trim curve is located in the second polygon.

24. The system as recited in claim 19, wherein the set of one or more additional polygons comprises one or more polygons neighboring the first polygon.

25. The system as recited in claim 19, wherein the set of polygons comprises a set of quadrilaterals, and wherein the plane approximates a quadrilateral containing the first point on the trim curve.

26. The system as recited in claim 19, wherein the points on the trim curve are determined by sampling the trim curve.

27. The system as recited in claim 19, further comprising:
an imaging device;
wherein the program instructions are further executable by the at least one processor to:
render the tessellated trimmed parametric surface; and
display the rendered tessellated trimmed parametric surface using the imaging device.

28. A computer-implemented method comprising:
performing, by a computer:
generating a tessellated trimmed parametric surface based on a parametric surface and a trim curve, said generating comprising:
tessellating the parametric surface to produce a set of polygons approximating the parametric surface;
determining a first polygon of the set of polygons in which a first point on the trim curve is located;
for each subsequent point on the trim curve after the first point on the trim curve:
projecting the subsequent point into a current plane, wherein the current plane is determined by a previous polygon containing a previous point on the trim curve;
projecting one or more additional polygons of the set of polygons into the current plane if the subsequent point is not located in the previous polygon; and
determining one of the additional polygons or the previous polygon in which the subsequent point on the trim curve is located if the subsequent point is not located in the previous polygon; and
trimming the set of polygons using the projected points.

* * * * *